United States Patent [19]
Grisley

[11] Patent Number: 5,711,356
[45] Date of Patent: Jan. 27, 1998

[54] FINGER JOINT TEMPLATE

[76] Inventor: Kenneth M. Grisley, c/o Leigh Industries, P.O. Box 357, Port Coquitlam, B.C., Canada, V3C 4K6

[21] Appl. No.: 606,239

[22] Filed: Feb. 23, 1996

Related U.S. Application Data

[63] Continuation of Ser. No. 274,854, Jul. 14, 1994, abandoned.

[51] Int. Cl.$^6$ ..................................................... B27M 3/00
[52] U.S. Cl. ................ 144/144.51; 144/144.52; 144/347; 144/372; 409/130
[58] Field of Search ..................... 144/137, 85, 87, 144/96.1, 144.1, 144.51, 144.52, 347, 372; 33/197; 409/115 R, 125, 130, 182

[56] References Cited

U.S. PATENT DOCUMENTS

| | | | |
|---|---|---|---|
| 2,764,191 | 9/1956 | Hartman | 144/87 |
| 3,057,383 | 10/1962 | Waite | 144/85 |
| 4,407,344 | 10/1983 | Dicke | 144/144.5 R |
| 4,428,408 | 1/1984 | Grisley | 144/144.5 |
| 4,445,277 | 5/1984 | Keefe | 144/144.5 R |
| 4,809,755 | 3/1989 | Pontikas | 144/372 |
| 5,114,265 | 5/1992 | Grisley | 144/144 R |
| 5,123,463 | 6/1992 | Grisley | 144/144.5 GT |
| 5,240,052 | 8/1993 | Davison | 144/372 |
| 5,285,832 | 2/1994 | Gibson | 194/144.5 R |

FOREIGN PATENT DOCUMENTS

| | | | |
|---|---|---|---|
| 77143 | 4/1983 | European Pat. Off. | 144/85 |

OTHER PUBLICATIONS

Partial European Search Report dated Dec. 5, 1995.
Elu E40045 Finger Jointing Template Operating Instructions.
Power, Profil und Prazision: Die Oberfrasen von Festo, p. 9.
Elu 1993 Elektrowerkzeuge, p. 55.
Leigh Woodworking Jigs and Accessories Catalog 1994, pp. 19, 29.

*Primary Examiner*—W. Donald Bray
*Attorney, Agent, or Firm*—Fish & Richardson P.C.

[57] ABSTRACT

A template for use with a jig having a workpiece positioning member. The template supports and guides a cutting tool used to cut joint members in two workpieces and comprises a support surface and at least one set of guides formed on the support surface for guiding the cutting tool. The support surface is movable with respect to the workpiece positioning member a predetermined distance between a first position to cut joint members in one workpiece and a second position to cut complementary joint members in another workpiece. This arrangement permits accurate routing of rounded or square finger joints or other types of uniform, spaced joints as determined by the template being used. Moving the template with respect to fixed workpiece positioning members means that no adjustment of the positioning members or workpieces is necessary between cutting of complementary joint members on separate workpieces which tends to result in more accurate cutting of the joints. In addition, there is disclosed an adjustable guidebush assembly for use with the template to vary the tightness of fit of the joint members.

12 Claims, 4 Drawing Sheets

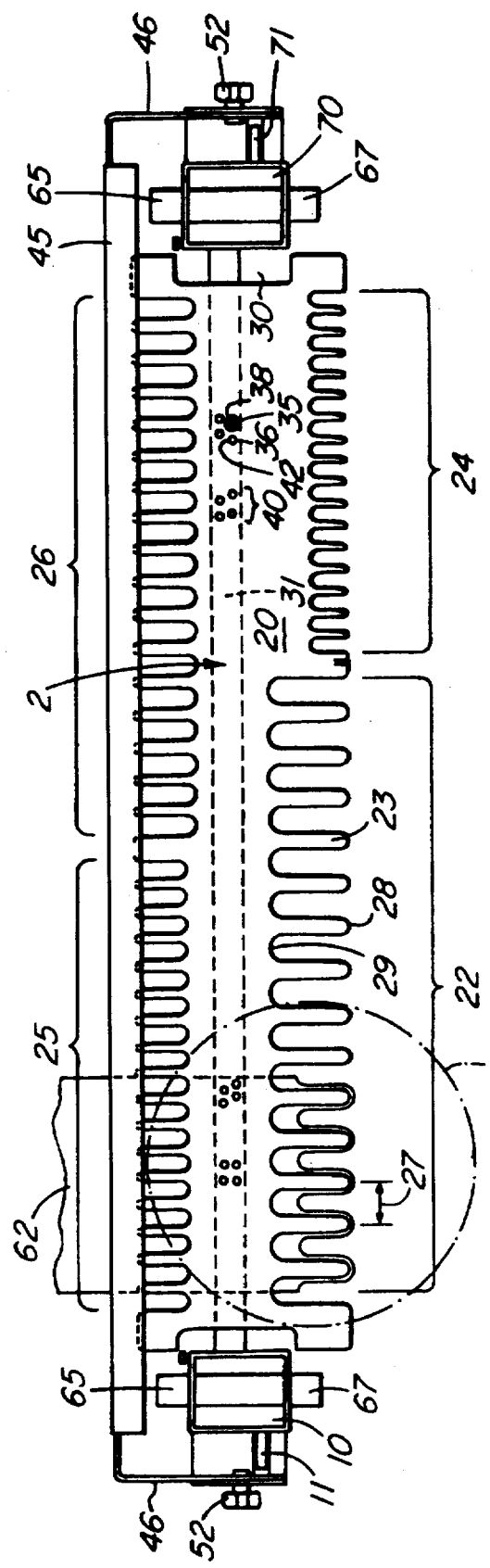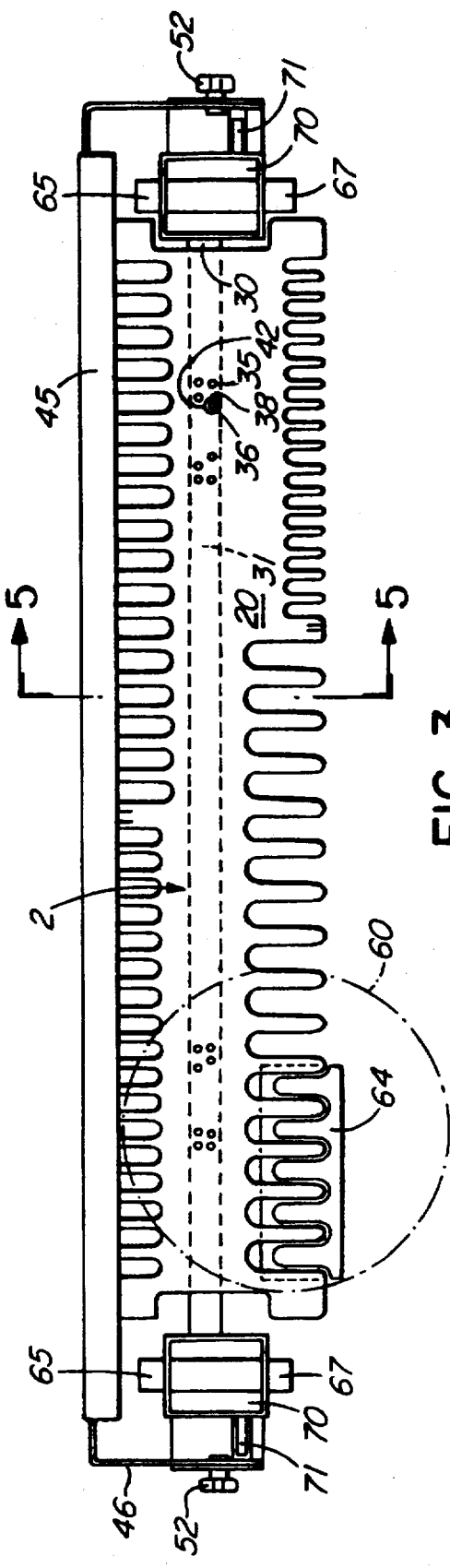

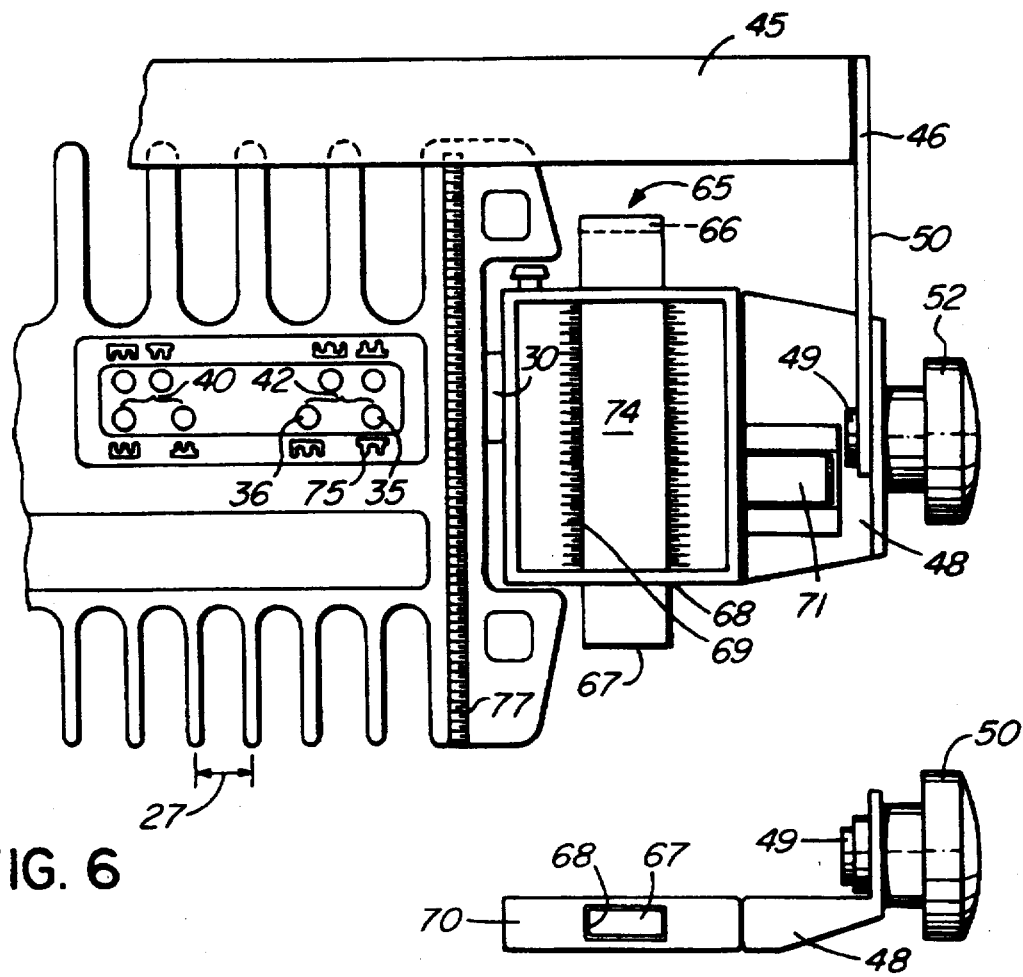
FIG. 6
FIG. 7
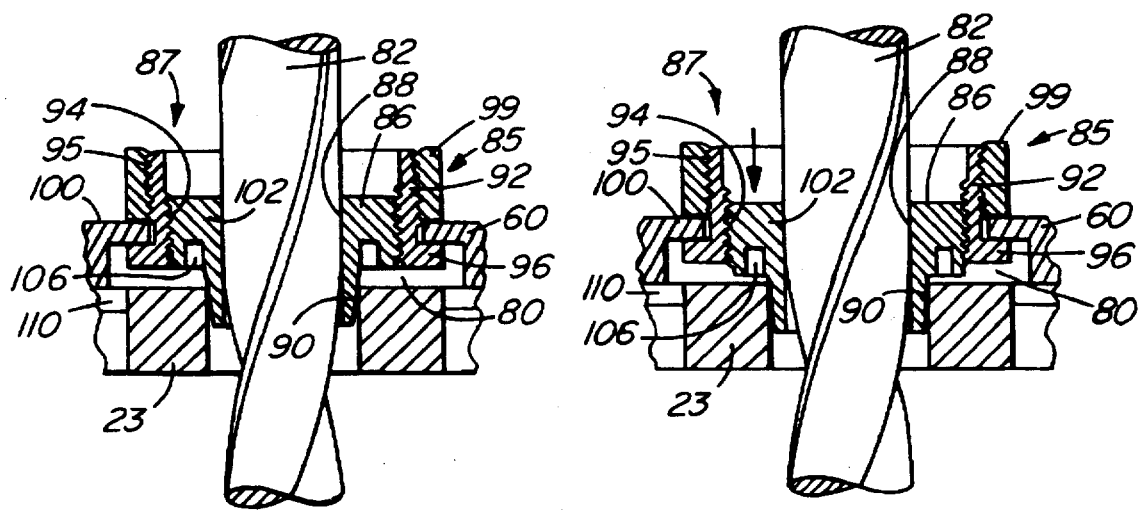
FIG. 10
FIG. 11

FINGER JOINT TEMPLATE

This application is a continuation of U.S. application Ser. No. 08/274,854, filed Jul. 14, 1994, now abandoned.

FIELD OF THE INVENTION

This invention relates to a device for guiding a power tool used to cut joint members in a workpiece. In particular, the device of the present invention is a template intended for making finger joints or box joints.

BACKGROUND OF THE INVENTION

It is well known to connect together workpieces with interconnecting joint members that are formed using a template that guides a cutting tool.

It is common to form "finger joints" or "box joints" in workpieces from an interlocking pattern of joint elements ("fingers" and "sockets") in which the joint elements are equally sized and repetitively spaced along the edges of the workpieces. The distance between successive joint elements on a particular workpiece is the pitch of the joint.

In my U.S. Pat. No. 4,428,408 that issued Jan. 31, 1984, entitled "Dovetailing Jig", there is disclosed a jig having a plurality of movable guide fingers that collectively serve as a template for cutting joint elements in workpieces. A cutting tool, such as a router having a depending cutting bit extending through an attached guidebush, is moved between the fingers. The guidebush engages the finger surfaces to control movement of the cutting bit. The fingers can be positioned to form joint elements of varying size and spacing as well as joint elements of uniform size and spacing. It is necessary to position the guide fingers individually.

In most existing jig and template equipment to form "finger" joints, the complementary joint elements of a workpiece are cut by offsetting one workpiece from the other by one-half pitch of the joint spacing under a fixed template. This ensures that the edge or outermost finger of one workpiece mates with the edge or outermost socket of the other workpiece to produce a flush alignment of the workpiece edges. In order to properly offset the workpieces, it is necessary to use a movable or adjustable positioning member or stop for positioning of the workpieces with respect to the fixed template and it is vital that the stop be carefully positioned to accurately reflect the offset of one workpiece with respect to the other. This system of moving or adjusting the positioning member in order to form joint members in a second workpiece that are complementary to joint members in a first workpieces generally limits the template that is guiding the cutting tool to a pattern for cutting a single shape and size of joint member. A different template is required to cut each different size or shape of joint member and the positioning member must be carefully adjusted a distance equal to half the pitch of the template being used.

In addition, it is desirable to be able to adjust the tightness of interfit of joint members cut using a template and jig. Generally, a fixed guidebush or collar is fitted about the cutting bit of the router to engage the guide surfaces of the template. The precise size of finished parts is normally achieved by altering the size of the template. All of the world's leading router manufacturers produce various fixed size (outside diameter) template guidebushes. Many also market box joint templates suitable for at least one cutter/guidebush size combination. Provision is not made to adjust template dimensions, guidebush diameters or cutter diameters. The latter three dimensions all have plus/minus manufacturing tolerances, which, when combined with router shaft/bearing wear (commonly called "run-out") leads to products that "on average" provide a good joint fit, i.e. some fits are correct but most are too tight or too loose. A too-tight fit can be overcome by reducing the guidebush diameter by trial and error. However this is a one-time solution for a particular setup which is nullified if, for instance, a larger diameter cutter is used the next time.

SUMMARY OF THE INVENTION

In view of the foregoing, there is a need for a template for a jig that can be used to quickly and efficiently cut joint members of various shapes and dimensions. As well, there is a need for a system that will permit rapid and easy adjustment of the tightness of fit of the joint members.

The present invention provides a template for use with a cutting tool and a jig having a positioning member to locate workpieces comprising:

guide means for supporting and guiding the cutting tool to cut joint members in the workpieces; and means for moving the guide means with respect to the workpiece positioning member a pre-determined distance between a first position to cut joint members in one workpiece and a second position to cut complementary joint members in another workpiece.

Moving the template with respect to fixed workpiece positioning members requires no adjustment of the positioning members or workpieces between cutting of complementary joint members on individual workpieces thereby allowing more accurate and faster cutting of the joints.

The template of the present invention is provided with guide means in the form of multiple sets of guide fingers. Each set of guide fingers is shaped and dimensioned to permit cutting of a particular size of joint member. By combining more than one set of guide fingers on a single template, the present invention is more versatile than prior art templates.

In one embodiment, the guide fingers of the present invention are formed with rounded tips to permit accurate cutting of both square and rounded joint members in workpieces. This embodiment of the present invention is intended for forming finger or box joints. It will be understood that alternative arrangements of the template guide fingers are possible. For example, applicant's U.S. Pat. No. 5,114,265, issued May 19, 1992 for an INTERLOCKING ROUTED JOINT, covers a jigsaw puzzle type joint. The specially formed fingers of this interlocking joint can also be used with the template arrangement of the present invention.

With respect to adjustment of joint member fit, the present invention also provides a guide bush for engaging with guide surfaces to control movement of a router having a base and a cutting bit extending through the base, the guide bush comprising:

an annular member adapted to be positioned about the cutting bit, the annular member having a central opening to receive the cutting bit and an external tapered surface that is engagable with the guide surfaces; and holding means removably attachable to the router base for receiving the annular member adjacent the router base about the cutting bit, the annular member being variably positionable with respect to the holding means and the router base whereby varying the position of the annular member varies the region of the tapered external surface that comes into contact with the guide surfaces such that the guided path of the router is varied.

BRIEF DESCRIPTION OF THE DRAWINGS

Aspects of the present invention are illustrated, merely by way of example, in the accompanying drawings in which:

FIG. 2 is a plan view of the template set up to cut a set of rounded fingers in a horizontal workpiece;

FIG. 3 is a plan view of the template set up to cut a complementary set of offset rounded fingers in a vertical workpiece;

FIG. 6 is a detail plan view of one end of the template;

FIG. 7 is a detail elevation view of the housing and flange arrangement formed at the end of the framework member;

FIG. 10 is a section view through an adjustable guidebush assembly useful with the template of the present invention for adjusting the tightness of fit of joint members; and FIG. 11 is a section view through the guidebush assembly adjusted to permit cutting of a tight joint.

DESCRIPTION OF THE PREFERRED EMBODIMENTS

Figure 1:
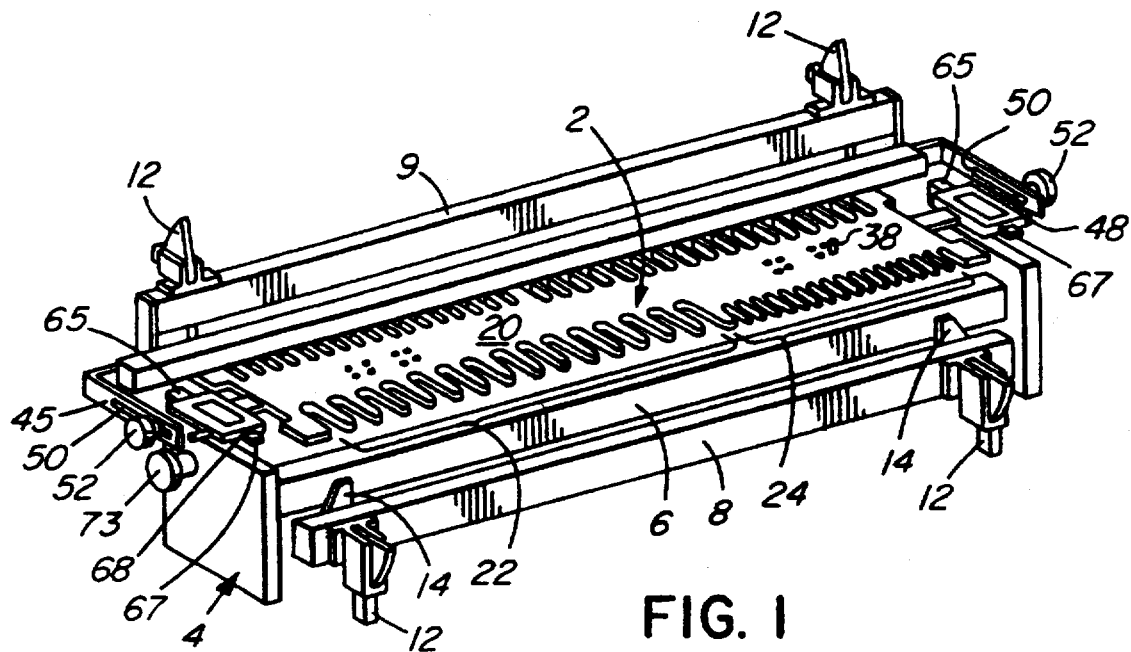
FIG. 1 is a perspective view of an embodiment of the template of the present invention mounted atop a jig for holding workpieces.

Referring to FIG. 1, there is shown a template 2 according to an embodiment of the present invention mounted atop a conventional jig 4. Jig 4 comprises a framework 6 to accept template 2 and a clamping system for holding workpieces in place below template 2. In the illustrated jig, the clamping system comprises clamping bar 8 adjacent a side of framework 6 to clamp workpieces in a vertical configuration and a second clamping bar 9 adjacent the top surface of the jig to clamp workpieces in a horizontal configuration below template 2. The clamping bars comprise longitudinal members attached to jig framework 6 via threaded posts for slidable movement on the posts. Cam action clamp members 12, that are covered by applicant's U.S. Pat. No. 5,156,508 issued Oct. 20, 1992, are threaded onto the threaded posts and are used to move the clamping bars into a clamping position. Alternatively, conventional rotatable knobs can be used to control the position of the clamping bars.

Jig 4 is provided with positioning or stop members 14 that act as reference surfaces against which workpieces are positioned before making cuts guided by template 2. Positioning members 14 are used to position both vertical and horizontal workpiece. Preferably, positioning members 14 are mounted to the jig by way of the threaded posts of the clamping bars. Unlike prior art template designs that require the positioning members to be moved or adjusted when making complementary finger joint cuts in a second workpiece, the positioning members 14 remain in the same position with the template of the present invention when making cuts in the first and second workpieces to be joined. The positioning members 14 and the template 2 are initially aligned and positioned with respect to a reference mark during assembly of the template and jig unit and after this indexing step the positioning members do not have to be moved.

Template 2 comprises guide means in the form of planar surface 20 for supporting and guiding a cutting tool, such as a conventional router, to cut joint members in workpieces positioned below template 2. As best shown in FIGS. 2 and 3, planar surface 20 is formed with at least one set 22 of a plurality of uniform fingers 23 extending from the edges of the surface to guide the cutting tool. Within a set, fingers 23 are spaced at a distance 27 equal to the pitch of the joint members to be cut, nominally twice the diameter of the cutting bit of the router. The design of the template of the present invention is such that other sets 24, 25 and 26 of guide fingers can be formed on planar surface 20. Each set of guide fingers is spaced and dimensioned to form joint members of a pre-determined pitch and size. This is unlike most conventional template designs that require a separate template for each different size and pitch of joint members.

In addition, each guide finger 23 of a set has a rounded tip 28 and a rounded base 29 between adjacent fingers. Rounded tip 28 allows each finger to guide a cutting tool to cut finger joint elements having rounded ends as well as square ends. In other words, the design of the present template also allows the shape of the joint elements to be varied for a joint having a particular pitch and size.

As previously mentioned, the template of the present invention is not limited to the design illustrated in the drawings. For example, a template according to applicant's U.S. Pat. No. 5,114,265 can be used with the apparatus of the present invention. Other template designs for making other types of joint members will be readily apparent to those skilled in the art.

The template design of the illustrated embodiment is able to accommodate multiple sets of guide fingers 23 and allows the same set of guide fingers to cut square or rounded joint elements by virtue of the fact that the template includes means for moving the planar surface 20 with respect to the workpiece positioning members 14 of the jig. Surface 20 is movable a pre-determined distance between a first position to cut joint members in one workpiece and a second position to cut complementary joint members in another workpiece. FIG. 2 illustrates the planar surface in the first position and FIG. 3 illustrates the planar surface moved to the second position. The means for moving the planar surface 20 comprises, for example, a fixed framework 30 that supports surface 20 for slidable movement on the framework.

Figure 4:
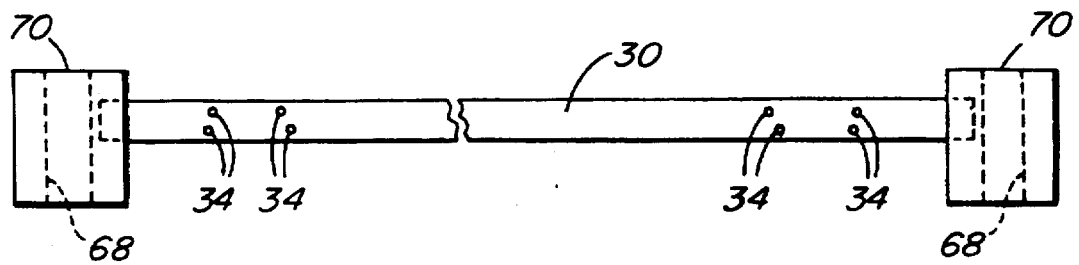
FIG. 4 is a plan view of the framework that supports the movable template of the present invention.
Figure 5:
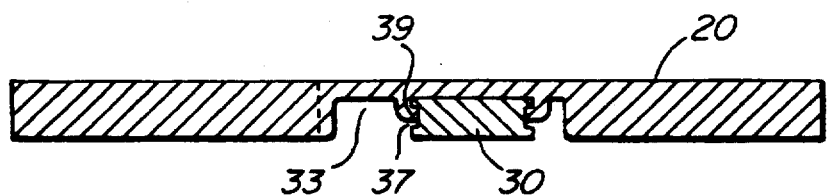
FIG. 5 is a section view taken along line 5—5 of FIG. 3 showing the manner in which the template and the framework member co-operate to permit movement of the template.

As best illustrated in FIG. 5, framework 30 comprises an elongate rail and planar surface 20 is formed with a corresponding slot 33 that slidably accepts the rail. Framework 30 is preferably formed with side channels 37 that accept fingers 39 to slidably connect the two parts. FIG. 4 shows framework 30 without surface 20 attached. In FIGS. 2 and 3, framework 30 extending below planar surface 20 is shown by dashed lines 31.

Template 2 is mounted to jig 4 by mounting means in the form of a pair of L-shaped extensions 65, each extension having a vertical arm 66 adapted to be clamped into a receiving cavity in jig 4 and a horizontal arm 67 that extends across the top of the jig. L-shaped extensions 65 are positioned at each end of the jig. FIG. 6 is a detail view of an end of template 2. As best shown in FIG. 6, horizontal arms 67 are adapted to fit into corresponding slots 68 formed in housings 70 at each end of framework 30. Once in a slot 68, thumbscrew clamp knobs 71 are rotated to lock arms 67 in slot 68 thereby positioning the template over the jig. Housings 70 are preferably provided with viewing windows 74 and gauges 69 to permit accurate positioning of the template on arms 67. A reference mark is formed on each arm 67 that is visible through window 74 for lining up with a gauge mark. This arrangement ensures that the template can be accurately and reliably positioned atop the jig. By careful positioning of template 2 on arms 67, the template and jig arrangement of the present invention can be adjusted to accommodate different thicknesses of vertically positioned workpieces clamped by bar 8. In a similar manner, vertical arms 66 of L-shaped extensions 65 can be adjusted up or down to change the height of the template above the jig to accommodate different thicknesses of horizontally aligned workpieces clamped by bar 9. In FIG. 1, there is shown a rotatable knob 73 that controls the clamping force on vertical arms 66.

When mounting template 2 to jig 4, only framework 30 is attached to the jig via L-shaped extensions 65 so that planar surface 20 is able to slide back and forth with respect to the jig and, more importantly, with respect to the fixed positioning members 14 of the jig.

The foregoing description is one arrangement that will permit movement of planar surface 20 with respect to the underlying jig and workpiece positioning members. It will be apparent to those skilled in the art that other arrangements are also possible to permit relative movement of a cutting tool guide means with respect to a positioning member for a workpiece.

Retaining means are provided to lock the planar surface 20 at the first and second positions for cutting joint members. FIG. 6 includes a detail view of a particular retaining means 40. The retaining means 40 comprise a cavity 34 (see FIG. 34) formed in framework 30 and first and second spaced holes 35 and 36, respectively, formed through planar surface 20, and pin 38 insertable through one of the holes and into cavity 34 to lock the surface in the desired position. By sliding planar surface 20 on framework member 30, one of holes 35 or 36 is alignable with framework cavity 34 to define the first and second positions of the planar surface.

Each set 22, 24, 25 and 26 of guide fingers has its own associated retaining system, that is, a cavity 34 in the framework and spaced holes 35 and 36 through planar surface 30 are formed for each set of fingers. Each cavity and pair of spaced holes is formed such that one position of a set of horizontal and vertical positioning members 14 on jig 4 locates all workpieces for the associated set of guide fingers. Each retaining system is located remote from the set of guide fingers that it regulates so that pin 38 does not interfere with movement of the cutting tool over planar surface 20.

In addition, in order to permit square and rounded joint elements to be formed using the same set of guide fingers, two retaining systems are necessary for each set of guide fingers. This is best illustrated in FIG. 6. Retaining system 40 is provided to permit the cutting of complementary square joint elements. In retaining system 40, holes 35 and 36 are spaced apart a distance equal to half the pitch of the joint members for cutting square box joints. Another retaining system 42 is provided to permit the cutting of complementary rounded joint elements. In retaining system 42, holes 35 and 36 are also spaced apart a distance equal to half the pitch of the joint members, however, the holes are offset one quarter pitch from the holes of retaining system 40 such that rounded half joint elements are formed at the edges of one workpiece as in FIGS. 8 and 9c. For ease of use, each hole 35 and 36 is labelled with a symbol 75 showing the shape of the finger joint that will be cut in the workpiece. The holes are also marked to identify the set of fingers they regulate for ease of operator use. In the illustrated embodiment, the holes are marked with the cutter size required.

The template of the present invention is also provided with means to control the horizontal depth of cut into a workpiece comprising a stop surface 45 positionable on the planar surface 20 to engage with base 60 of the router cutting tool to limit movement of the router cutting blade between the guide fingers 23. Router base 60 is shown by dashed lines in FIGS. 2 and 3. Stop surface 45 is formed with brackets 46 at each end that are formed with slots 50. As best shown in FIGS. 6 and 7, template 2 is formed with flanges 48 at each end that extend outwardly and upwardly from housing 70 of framework 30. Threaded posts 49 extend through an aperture in flanges 48 and through slots 50. The protruding ends of posts 49 receive rotatable knobs 52 to attach stop surface 45 on framework 30. Knobs 52 are tightenable against flanges 48 to clamp stop surface 45 into a particular position. Posts 49 are slidable in slots 50 of brackets 46 to allow the position of stop surface 45 on planar surface 20 to be adjusted. Also, stop surface 45 can be pivoted about posts 49 from one side of planar surface 20 to the other for use with all sets of guide fingers. A gauge 77 is formed across template 2 at each end so that the alignment of stop surface 45 can be easily checked to ensure it is parallel to the template.

The template apparatus of the present invention is used in the following manner:

Referring to FIG. 2, a first workpiece 62 is positioned horizontally below template 2 adjacent the set of guide fingers appropriate for making the desired size of joint elements. In the present case, workpiece 62 is positioned horizontally below set 22 of the guide fingers by abutting the workpiece against a positioning member 14 at the rear of the jig and clamping the workpiece in place atop jig 4. Stop surface 45 is positioned to control the depth of cut into the workpiece. A cutting tool, such as a conventional router with a "straight" cutter, is then run between and around fingers 23 to cut appropriate joint members in the workpiece. Stop surface 45 engaging with router base 60 controls the horizontal depth of cut into the workpiece. In FIG. 2, the template is positioned to cut round joint elements by using the appropriate retaining system 42 with pin 38 inserted into hole 35. Note that half joint socket elements are formed at the edges of the workpiece. If square joint elements were to be formed, template 2 would be positioned using retaining system 40, but both workpieces 62 and 64 would be clamped vertically below the template.

FIG. 3 shows the steps necessary to cut complementary joint elements in a second workpiece 64. Pin 38 is removed from hole 35 and the template 2 is moved on framework 30 to align hole 36 with the cavity in the framework. This movement is over a distance equal to half the pitch of the joint elements. Pin 38 is inserted to lock the template in its new position that will ensure that complementary joint members are formed in a workpiece that is positioned against the fixed positioning members 14 at the front of the jig 4 that is aligned with the positioning member 14 at the rear of the jig. Workpiece 64 is abutted against positioning members 14 and clamped in place against jig 4 in a vertical orientation such that the end of the workpiece is positioned below template 2. Once again, the router cutting tool is moved between and around the fingers to cut joint elements in the second workpiece that are complementary to the joint elements of the first workpiece. As well, when cutting rounded joint elements, the tips 28 of guide fingers 23 are used to guide the cutting tool so that appropriately rounded joint elements are formed. Since stop surface 45 is not moved between cutting of the first and second workpieces, the resulting joint elements are the same length and a matching joint is formed between rounded fingers and rounded sockets.

Figure 8:
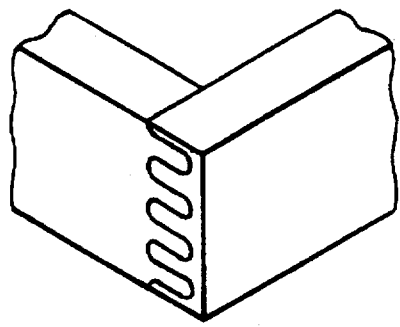
FIG. 8 is a perspective view of the joint created by the cuts shown in FIG. 2 and 3.
Figure 9A:
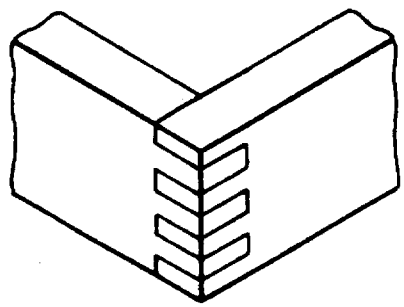
FIGS. 9a–9f are perspective views of various joints that can be formed with the template of the present invention.
Figure 9B:
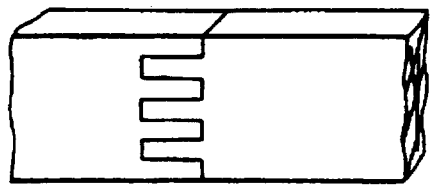
Figure 9C:
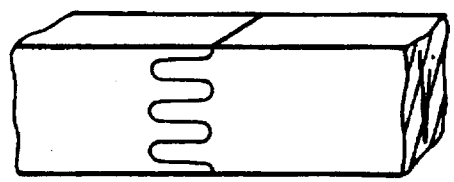
Figure 9D:
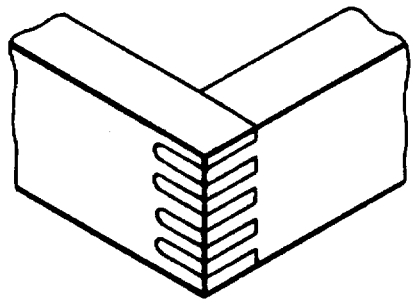
Figure 9E:
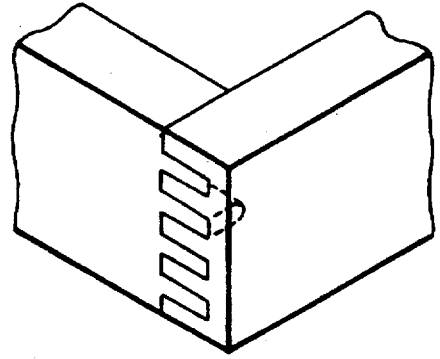
Figure 9F:
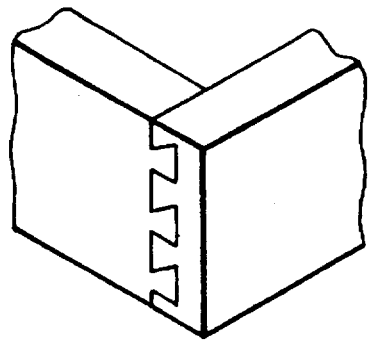

FIG. 8 illustrates the rounded half-blind finger joint created when the template of the present invention is used as shown in FIGS. 2 and 3. The template can be used to create many other types of joints that use uniform, regularly spaced joint elements. For example, the template of the present invention can also produce joints such as square finger joints (FIG. 9a), square end-on-end joints (FIG. 9b), round end-on-end joints (FIG. 9c), rounded-square finger joints (FIG. 9d), rounded-square half blind finger joints (FIG. 9e) and dovetail joints (FIG. 9f).

In any template apparatus, it is desirable to be able to adjust the tightness of fit of the joint members. FIGS. 10 and 11 illustrate an adjustable guidebush assembly that is useful with the foregoing template and jig arrangement to permit rapid and easy adjustment of joint member fit.

In FIG. 10 and 11, there is shown a detail cross-section view of a router base 60 having an aperture 80 therethrough to accommodate a cutting bit 82 extending downwardly from a router (not shown). Router base 60 is shown resting on template surface 20 with bit 82 positioned between a pair of template fingers 23. Guide bush assembly 85 comprises an annular member 86 adapted to be positioned about bit 82 and holding means 87 for mounting the annular member on base 60.

In the illustrated embodiment, holding means 87 includes a ring member 92 of generally cylindrical configuration having internal threads 94 and external threads 95. A lower annular flange 96 is formed at the base of the ring member. There is a threaded lock ring 99 adapted to engage the external threads 95 of the ring member. The ring member is insertable through aperture 80 in router base 60. Aperture 80 is formed with a lip 100 under which flange 96 engages. Locking ring 99 is tightened against base 60 to clamp ring member 92 to the base about lip 100 such that the ring member is aligned with the axis of bit 82. Alternative holding means are possible including an arrangement in which a plate is bolted directly to the router base to support annular member 86.

Annular member 86 has a central opening 88 to accommodate bit 82 and an external tapered surface 90 that is engagable with the guide surfaces of fingers 23. Annular member 86 is also formed with an enlarged head 102 above tapered surface 90. Head 102 has external threads adapted to engage internal threads 94 of ring member 92.

Head 102 is formed with a pair of sockets 106 to accept a 2 pin wrench to permit rotation of annular member 86 within ring member 92 to raise and lower tapered surface 90 along the cutting bit axis. As shown in FIG. 11, lowering annular member 86 effectively increases its active diameter, allowing less lateral movement of the bush assembly and cutter between the guide fingers 23 of the template. This will cause narrower sockets to be routed and conversely wider pins, ensuring a tight or overtight fit. The opposite effect is created by raising the annular member 86 thereby decreasing its active diameter against the template. This will produce wider sockets and narrower pins, ensuring a loose or sloppy fit. Trial and error testing and annular member height adjustment would soon affect a perfect fit.

Ideally, but not necessarily, the template would be manufactured with a top edge bevel which matches the angle of the tapered guidebush. However this bevel would be shallow enough to allow the use of "standard" diameter parallel sided guide bushes. Such a bevel is shown at 110 in FIGS. 10 and 11.

Although primarily intended for use on finger or box joint templates or on any template where no other means of adjustment is available (for example, where only straight cutters are used), the foregoing guidebush system will be useful even on such templates as a half blind dovetail jig. On the latter, the tightness of fit is achieved by raising or lowering the angled dovetail cutter. However, there are times when a particular depth of cut is required (e.g. when lipped or rabbeted drawer fronts are routed) but cannot be achieved except at the cost of a good fit. In this instance, using adjustable tapered guidebushes would allow for a secondary adjustment to achieve both the correct depth of cut, and a good fit.

The apparatus of the present invention is not limited to forming finger elements that are dimensioned according to the size of the template guide fingers. If more versatility is required, it is possible to create square box joints that are half the size of the nominal dimensions of the guide fingers. Since the holes of retaining system 40 are offset by one quarter pitch with respect to the holes of retaining system 42 for each of the four sets of template guide fingers, it is possible to make two passes through a single workpiece using a cutter that is half the nominal diameter but with a nominal sized guide bush for that template. For example, a single board clamped vertically below the template is routed twice, once with the template positioned by pin 38 in hole 35 of retaining system 42 and again with pin 38 in hole 36 of retaining system 42. This will create a series of equal sized finger joints that are spaced at one half the nominal dimensions of the guide fingers. Then the second complementary board is clamped into place and routed twice, once with the template positioned by pin 38 in hole 35 of retaining system 40 and again with the pin 38 in hole 36 of retaining system 40. The resulting square box joint has double the number of fingers and sockets. In this manner, a template according to the present invention having sets of guide fingers to cut additional joint elements at nominal sizes of ¼", ⁵⁄₁₆", ⅜" and ½" can be used to cut additional joint elements of ⅛", ⁵⁄₃₂", and ³⁄₁₆".

From the foregoing, it will be apparent the present invention greatly facilitates the cutting of various kinds of interlocking joints.

Although the present invention has been described in some detail by way of example for purposes of clarity and understanding, it will be apparent that certain changes and modifications may be practised within the scope of the appended claims.

I claim:

1. A template for use with a cutting tool and a jig having a positioning member to locate workpieces comprising:
   guide means for supporting and guiding the cutting tool to cut joint members in the workpieces; and
   means for moving the guide means with respect to the workpiece positioning member a pre-determined distance between a first position to cut joint members in one workpiece and a second position to cut complementary joint members in another workpiece.

2. A template as claimed in claim 1 in which the guide means comprises a planar surface having a plurality of uniform fingers extending therefrom to guide the cutting tool, the fingers being spaced at a distance equal to the pitch of the joint members to be cut.

3. A template as claimed in claim 2 in which the uniform fingers have a tip and a base, the tip being rounded to permit cutting of fingers having rounded ends.

4. A template as claimed in claim 1 in which the means for moving the guide means comprises a fixed framework that supports the guide means for slidable movement on the framework.

5. A template as claimed in claim 4 including means for removably mounting the framework to the jig.

6. A template as claimed in claim 4 including retaining means to lock the guide means at the first and second positions.

7. A template as claimed in claim 6 in which the retaining means comprises:

a cavity formed in the framework;

first and second spaced holes associated with the guide means and alignable with the cavity to define the first and second positions of the guide means; and a pin insertable through one of the holes and into the aligned cavity to prevent movement of the guide means with respect to the fixed framework.

8. A template as claimed in claim 6 including at least two retaining means, the first retaining means locking the guide means at first and second positions for making complementary square joint members in workpieces, and the second retaining means locking the guide means at first and second positions for making complementary rounded joint members in workpieces.

9. A template as claimed in claim 6 in which the guide means comprises a planar surface having at least one set of a plurality of uniform fingers extending therefrom to guide the cutting tool, each set of uniform fingers being spaced and dimensioned to form joint members of a pre-determined pitch and size.

10. A template as claimed in claim 9 in which each set of uniform fingers has associated retaining means to lock the uniform fingers of the set in first and second positions according to the spacing and dimensions of the uniform fingers.

11. A template as claimed in claim 1 including means to control the depth of cut into a workpiece.

12. A template as claimed in claim 11 in which the means to control the depth of cut into a workpiece comprises a stop surface positionable on the guide means to engage with the cutting tool to limit movement of the tool on the guide means.

* * * * *